United States Patent [19]
Keranen

[11] 3,982,503
[45] Sept. 28, 1976

[54] AIR DENSITY COMPUTER FOR AN INTERNAL COMBUSTION ENGINE FUEL CONTROL SYSTEM

[75] Inventor: Theodore W. Keranen, Pontiac, Mich.

[73] Assignee: The Bendix Corporation, Southfield, Mich.

[22] Filed: Aug. 23, 1972

[21] Appl. No.: 283,144

[52] U.S. Cl............................ 123/32 EA; 123/179 L
[51] Int. Cl.².......................... F02B 3/00; F02D 1/04
[58] Field of Search ....... 123/32 EA, 32 AE, 179 L; 73/362 SC

[56] References Cited
UNITED STATES PATENTS

| | | | |
|---|---|---|---|
| 2,870,310 | 1/1959 | Overbeck | 73/362 SC |
| 2,871,376 | 1/1959 | Kretzmer | 73/362 SC |
| 3,219,843 | 11/1965 | Follett | 73/362 SC |
| 3,500,803 | 3/1970 | Long | 123/32 EA |
| 3,589,345 | 6/1971 | Benson | 123/32 EA |
| 3,592,177 | 7/1971 | Wehde | 123/32 EA |
| 3,646,917 | 3/1972 | Nagy | 123/32 EA |
| 3,682,152 | 8/1972 | Muller | 123/32 EA |

Primary Examiner—Charles J. Myhre
Assistant Examiner—Ronald B. Cox
Attorney, Agent, or Firm—James R. Ignatowski

[57] ABSTRACT

An air density computer is disclosed herein for controlling the fuel injected into an internal combustion engine to maintain a desired air to fuel ratio during the engine's warm-up period. The air density computer responds to a temperature sensor, mounted in the engine's air intake manifold, and computes a density signal indicative of the relative density of the air as a function of the air's temperature. The fuel control computer responds to this density signal as well as other sensor inputs and generates output signals indicative of the engine's fuel requirements which are corrected for the higher density of the cold air inhaled by the engine during the transient warm-up period.

3 Claims, 5 Drawing Figures

AIR DENSITY COMPUTER FOR AN INTERNAL COMBUSTION ENGINE FUEL CONTROL SYSTEM

BACKGROUND OF THE INVENTION

1. Field of the Invention

This invention relates to improvements in electronic fuel control systems for internal combustion engines and particularly to improvements in automotive electronic fuel control systems wherein the quantity of fuel injected into the engine is computed from signals indicative of the engine's operating parameters derived from various sources. In particular, the present invention is a fuel control system deriving a signal indicative of the density of the air in the engine's intake manifold from an air density computer. The system accurately computes the engine's fuel requirement maintaining the desired air to fuel ratio during the transient period, between the time the engine is started and the time the engine and its accessories reach normal operating temperatures.

2. Description of the Prior Art

The known electronic fuel control systems employ various sensory inputs to compute the engine's fuel requirements of the internal combustion engine. It is well known that fuel enrichment is required to start a cold engine and sustain its operation until some nominal engine temperature, usually about 25°C is reached. The prior art has recognized the requirement for fuel enrichment during the warm-up period of an internal combustion engine, and a number of patents disclose means for providing additional fuel to the engine during the warm-up period. However, the prior art fuel enrichment has primarily been directed to sustaining engine operation during the warm-up period and is terminated as soon as possible. Recent concern over the emission of excessive undesirable gases from the exhausts of automotive engines has caused attention to be focused on the warm-up period during which many of the engine's operating parameters are changing.

Various factors are known to influence the engine's fuel requirements during the transient period between the time the engine is started and it reaches normal operating temperatures of approximately 75°. The first and the overriding factor is the condensation of fuel injected into the cold air intake manifold. This is a short term process which terminates when the surfaces surrounding the intake valve become sufficiently warm to cause complete vaporization of the injected fuel. The injected fuel is normally sprayed in the immediate vicinity of the intake valve which heats relatively fast, ending the requirement for additional fuel after a predeterminable temperature of about 25°C is reached. This time is normally less than a few minutes.

The second factor is the change in the air density as a function of its temperature. Test have demonstrated that during the transient period between start and time the engine reaches normal operating temperatures carbon monoxide (CO) emissions gradually increase. This increase in CO emissions extends well beyond the time when conventional fuel control computers responding to engine sensors monitoring the temperature of the engine or its coolant have ceased to correct the fuel delivery as a function of engine temperature. The exhaust carbon monoxide level is known to be an indicator of the engine's air to fuel ratio, and since it is assumed that the fuel control computer is correcting properly for the pressure in the air intake manifold, the increase in carbon monoxide level is attributed to changes in the density of the air during this transient period.

The temperature of the air being inhaled by the engine is a function of various factors. The first is the ambient temperature of the air prior to entering the air intake manifold. This factor is discussed in U.S. Pat. No. 3,456,628 which discloses a temperature sensor at the inlet to the air intake manifold providing a second order correction to the fuel control computer for the ambient air temperature. However, prior to entering the engine's combustion chamber, the ambient air is heated by several sources, these are: (1) the air cleaner, throttle body and intake manifold which are in thermal contact with the engine and warm up more slowly due to their thermal inertia and remote location; (2) the recirculated exhaust gases (EGR) which are admitted into the intake manifold to reduce the emissions of the nitrogen oxides ($NO_x$), (3) the residual exhaust gas left in the cylinder and the intake port after the exhaust stroke of the engine, and (4) the intake port and the interior surfaces of the cylinders which become hotter after the engine warms up. These sources heat the air to different degrees and at various rates which may extend well beyond the time indicated by sensors detecting the engine temperature or the temperature of its coolant.

The prior art has also recognized that fuel requirement of an engine during the warm-up period is a composite of factors other than the temperature at the intake valve port and the temperature of the ambient air. U.S. Pat. No. 3,566,846 touches upon corrections to the quantity of fuel delivered to the engine as being a composite of two phenomenon, one having a short time constant which may be related to the condensation phenomenon discussed above, and the second having a longer time constant (approximately X5) which may be a combination of fuel and air temperatures. The fuel delivery correction of U.S. Pat. No. 3,566,846 is based on information received from an oil temperature sensor having approximately the desired temperature lag. However, in the above patent, the correction is only operative when the oil temperature is below 0°C, and therefore is directed to the starting and initial warm-up period of an engine operating in an extremely cold environment below 0°C and not to the transient conditions which still exists at temperatures well above 0°C. Extending the concept of this patent to cover the desired temperature range provides an approximate correction to the fuel requirements of the engine, but is deficient because the temperature sensed is subject to variables which are not directly related to the temperature of the air in the intake manifold of the engine. The quantity of oil in a conventional engine may vary by as much as 20 percent, the viscosity of the oils used in winter and summer differ considerably, and the contaminated state of the oil may cause significant changes in its thermal properties. These and other independent variables degrade the correspondence between the rate at which the air in the intake manifold heats up and the rate at which the oil heats up.

U.S. Pat. No. 3,589,345 briefly mentions an auxiliary control device of conventional form, to compensate for engine and air temperature and suggests a single sensor at the intake valve port for measuring the combined effect of both engine and air temperature. The function of this single sensor is directed towards the cooling effect of cold air on the temperature of the engine at the intake valve port, i.e., the compensation for the condensation of fuel injected into a cold engine, rather than the change in air density as a function of temperature during the transient warm-up period. The sensor discussed in Pat. No. 3,589,345 is the conventional engine temperature sensor located in a unique position and gives a more accurate determination of the temperature in the area where the fuel is injected than a remote sensor measuring the temperature of the engine's coolant.

Another patent which is also addressed to fuel compensation as a function of temperature is U.S. Pat. No. 3,605,703 which discloses a method for correcting the length of the fuel injection pulse to compensate for the formation of gas bubbles in the fuel when the engine is running hot or after a hot soak. The above patent is directed to the upper limits of the engine temperature spectrum and the density of the fuel rather than the density of the air.

SUMMARY OF THE INVENTION

The present invention provides a special function air density computer for an electronic fuel control computer capable of correcting the fuel delivery to the engine during the engine's transient warm-up period. The air density computer detects the temperature of the air in the engine's intake manifold and generates a signal for the fuel control computer causing the computer to provide additional fuel to the engine to compensate for the increased density of the cold air being inhaled by the engine between the period when the engine is started and the engine and its accessories reach normal operating temperatures. The fuel delivery compensation, afforded by the air density computer maintains a desired fuel to air ratio during the transient period following the starting of a cold engine and reduces the emission of undesirable exhaust emissions.

DETAILED DESCRIPTION OF THE PREFERRED EMBODIMENT

Figure 1:
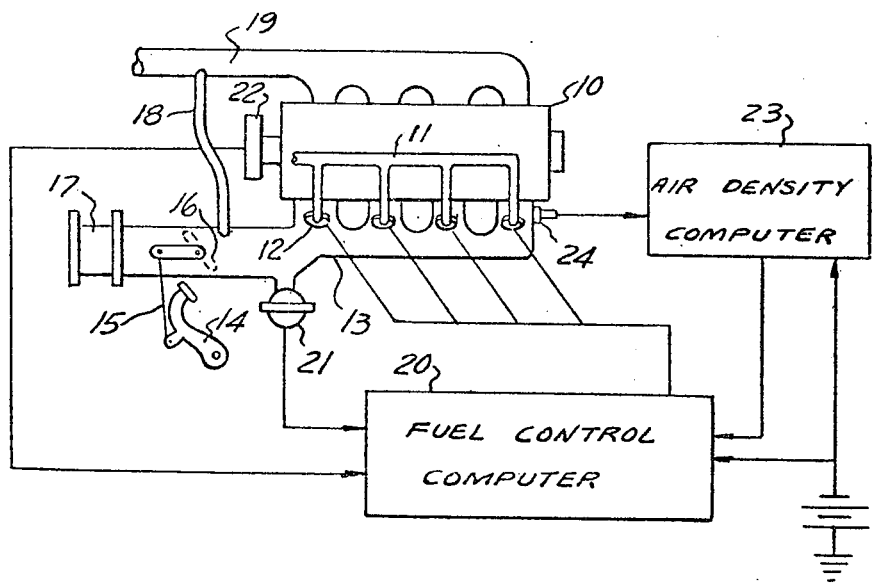
FIG. 1 is a schematic illustrating an internal combustion engine, its fuel control computer, the air density computer and the functional relation.

Referring to FIG. 1 an internal combustion engine, the electronic fuel control system with the inventive air density computer are shown in schematic form. The system is comprised of an internal combustion engine 10 with its input fuel system 11 delivering fuel to a set of electrically activated fuel injector means 12 located on the intake manifold 13. The air flow to the engine is controlled by an operator positioned throttle control, illustrated as a foot pedal 14, which activates by means of a linkage 15 the throttle valve 16 located in the air intake manifold. Air is introduced into the manifold through an air filter 17 while recirculated exhaust gases enter the intake manifold by means of passage 18 connecting the exhaust manifold 19 with the intake manifold 13. The fuel delivery to the engine 10 is controlled by the fuel control computer 20 which responds to the signals from engine sensors, such as the intake manifold absolute pressure sensor 21, the engine speed sensor 22, and others not shown, indicating engine operating conditions. The fuel control computer 20 computes the correct amount of fuel required for efficient operation of the engine and produces electrical fuel signals indicative of the engine's fuel requirement. These fuel signals activate fuel injector means 12 which introduce fuel into the intake manifold in proportion to the signals received. The inventive Air Density Computer 23 is an electronic control circuit responsive to the signals from an associated Temperature Sensor 24 detecting the temperature of the air in the intake manifold. The air density computer responds to the signals from the temperature sensor and generates density signals operative to modify the fuel signals generated by the fuel Control Computer 20 and compensates for the temperature dependent density variations of the air in the intake manifold.

Figure 2:
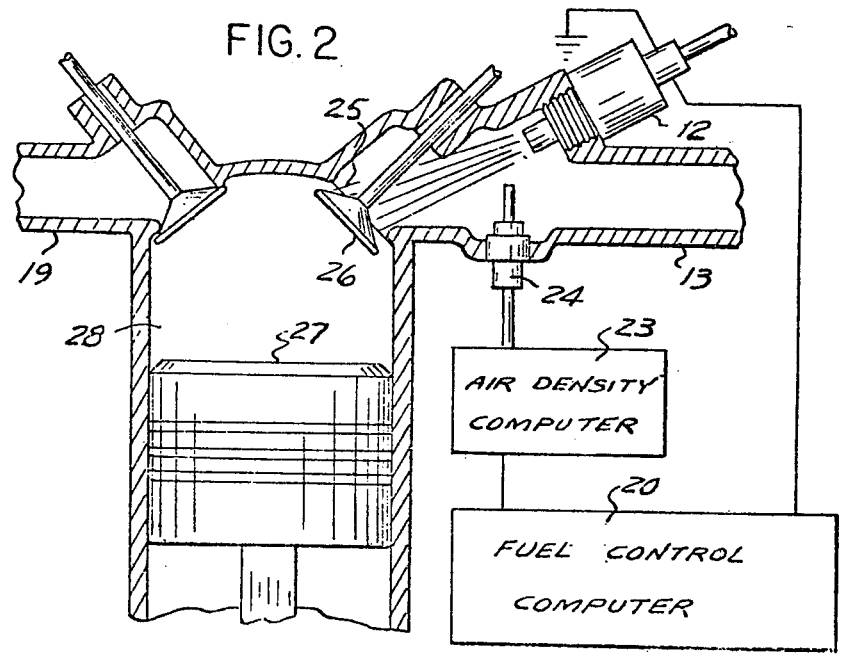
FIG. 2 is a sectional drawing of an internal combustion engine showing a preferred location of the temperature sensor.

FIG. 2 is a partial cross section of the Engine 10 shown in FIG. 1. The Temperature Sensor 24 is located in the intake manifold in proximity to the Intake Valve Port 25 but outside the spray cone of the Fuel Injector 12 so that the fuel spray will not affect the reading of the temperature sensor. The Temperature Sensor 24 is insulated from the walls of the intake manifold and detects the temperature of the intake air directly. As the Piston 27 approaches the top of its stroke, the Intake Valve 26 opens and residual gases from the combustion chamber flow into the intake manifold. These gases contribute to the heating of the air in the intake manifold in the immediate vicinity of the intake valve port. As the piston 27 withdraws from its uppermost position during the intake cycle, it decreases the absolute pressure in the combustion chamber which causes air in the Intake Manifold 13 to flow into the Combustion Chamber 28. The Temperature Sensor 24 in the immediate vicinity of the intake valve port senses the temperature of the air flowing into the combustion chamber. It is evident that the temperature sensor will be exposed to rapid changes in temperature between the time the residual exhaust gases enter the intake manifold and the time the air in the manifold begins to flow into the combustion chamber during the intake cycle. The response time of most temperature sensors is adequately slow to integrate over these temperature fluctuations and produce a signal which is indicative of the average temperature of the air flowing into the combustion chamber. Although the temperature sensor in the preferred embodiment is illustrated as being located as close as possible to the intake valve port, alternate locations further upstream in the intake manifold but downstream from the point where the recirculated exhaust gases are emitted into the intake manifold may also be used. The temperature sensor at these remote locations will not detect the temperature at the intake port directly and will be affected to a lesser degree by temperature of the gases emitted into the manifold from the combustion chamber. However, the air density computer may be designed to empirically compute the average air temperature at the input port. The volume of gas inhaled by each stroke of the piston is a constant depending on the physical geometry of the combustion chamber and the length of the piston stroke. It is therefore assumed that the volume of gas inhaled by each piston stroke is a constant. Basic gas laws teach that at a constant pressure the expansion of most gases is a relatively constant function of temperature, therefore, the density is inversely proportionately to the absolute temperature. This is mathematically expressed as:

Density = $K$/Absolute Temperature where $K$ is a constant at a given pressure. The pressure may be considered a constant because it is assumed that the fuel control computer is already adequately compensating for the air pressure in the intake manifold.

The function of the air density computer is to generate an electrical signal which is indicative of the inverse function of the temperature of the air in the intake manifold and which will cause the fuel control computer to correct the amount of fuel injected into the engine in proportion to the change in air density.

Figure 3:
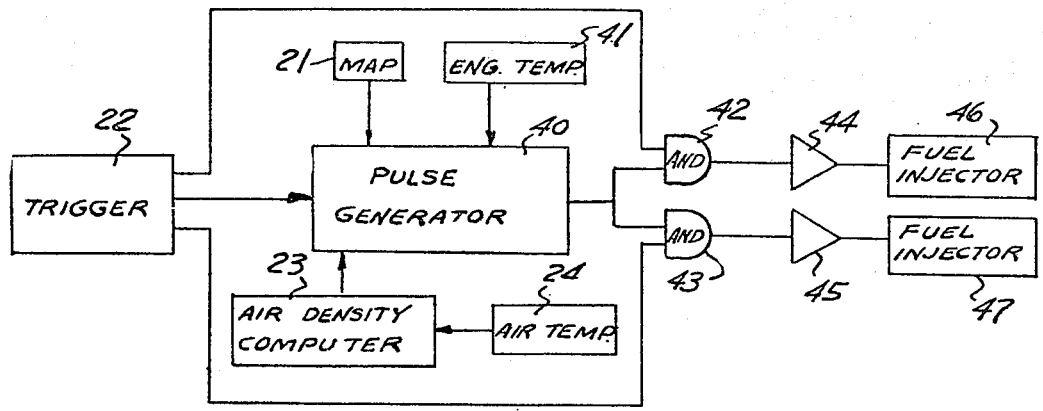
FIG. 3 is a block diagram illustrating the application of the air density computer to a fuel control computer generating a single injection pulse.

Two types of electronic fuel control computers for internal combustion engines are prevalent in the existing art. The first type of computer comprises a single pulse generator and the output signal is determined primarily by the engine speed, the manifold absolute pressure (MAP) and probably the engine temperature. This type of computer is schematically illustrated in FIG. 3. The second type of electronic fuel control computer, illustrated in FIG. 4, comprises at least two pulse generators generating sequential signals which activate the fuel injector means. The duration of the pulse generated by one pulse generator may be determined by the manifold absolute pressure and the duration of the second pulse generated by the second pulse generator may be determined by the engine temperature.

Referring to FIG. 3, the Fuel Control Computer 20 is illustrated as Pulse Generator 40 which may be an electronic multivibrator receiving sensor signals from a Trigger Sensor 22, generating a signal indicative of the engine's speed and crank angle, a Manifold Absolute Pressure Sensor 21, and an engine Temperature Sensor 41. The Pulse Generator 40 responds to the sensor signals and generates a fuel signal indicative of the engine's fuel requirements. The fuel signal from the Pulse Generator 40 is transmitted to AND Gates 42 and 43. Crank Angle signals from the trigger are also transmitted to the alternate inputs of the AND Gates 42 and 43. The AND gates alternately communicate the fuel signals generated by the pulse generator to Amplifiers 44 or 45 depending upon the crank angle of the engine. The amplified fuel signals activate sets of Fuel Injectors 46 or 47 injecting fuel into the engine in proportion to the duration of the signals generated by the pulse generator. The Air Density Computer 23 responds to the temperature signals generated by the Temperature Sensor 24 monitoring the temperature of the air in the intake manifold and generates a density signal communicated to Pulse Generator 40. The pulse generator responds to the density signal and compensates the duration of the computed fuel signal for the change in density of the air inhaled by the engine due to its change in temperature.

Figure 4:
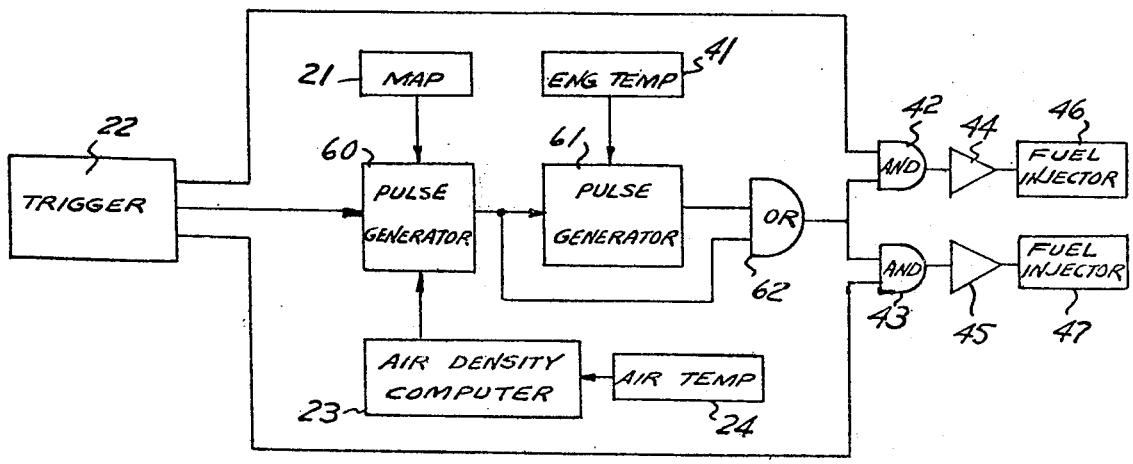
FIG. 4 is a block diagram illustrating the application of the air density computer to a fuel control computer generating two sequential injection pulses.

Referring to FIG. 4, the First Pulse Generator 60 of the Fuel Control Computer 20 receives signals from the Trigger 22 and the Manifold Absolute Pressure Sensor 21 and generates a first signal having a duration which is a function of the manifold pressure. This signal activates the second Pulse Generator 61 which also responds to the Engine Temperature Sensor 41 and produces a second signal which is a function of both, the manifold absolute pressure and the engine temperature. The signals generated by the First Pulse Generator 60 and the Second Pulse Generator 61 are communicated to an OR Gate 62 where they sequentially combine to produce a fuel signal indicative of the fuel requirements of the engine. The output signal of the OR gate is combined with the crank angle signals from the Trigger 22 at AND gates 42 and 43, amplified by Amplifiers 44 and 45 and activate Fuel Injectors 46 and 47 as discussed with reference to FIG. 3. Likewise, the Air Density Computer 23 responds to the output of the Temperature Sensor 24 and generates a density signal communicated to the First Pulse Generator 60. The pulse generator responds to the density signal, and the duration of its output pulse is compensated for the change in the density of the air due to its change in temperature. Since the second Pulse Generator 61 is responsive to the duration of the signal from the first pulse generator, both pulse generator output signals are compensated for the change in air density in the intake manifold due to changes in the temperature of the air.

Figure 5:
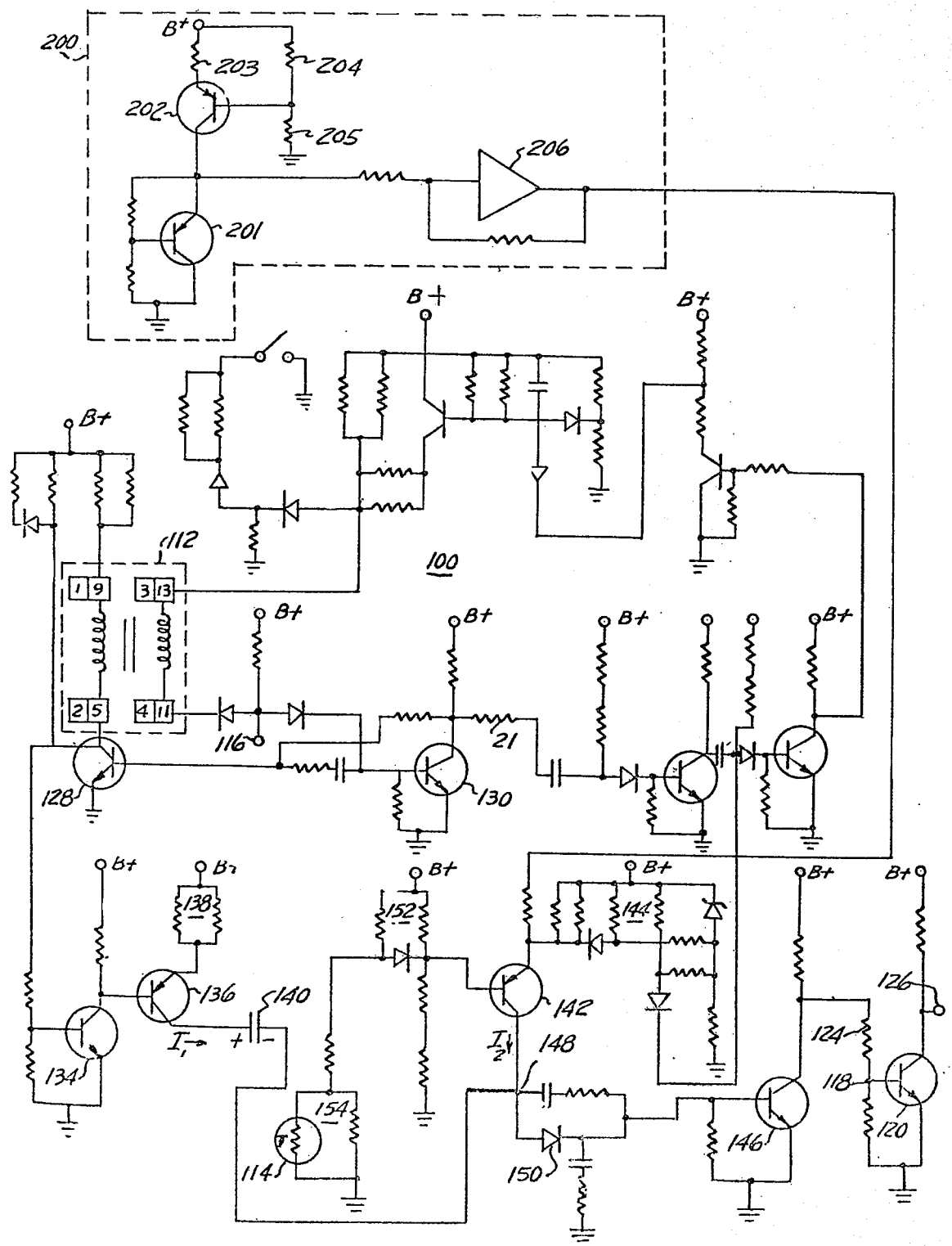
FIG. 5 is a circuit diagram illustrating a preferred embodiment of the air density computer.

Referring to FIG. 5, an Electronic Fuel Control Computer Circuit 100 of the type described in U.S. Pat. No. 3,646,915 modified to generate a single output pulse is shown. The circuit is energized by a voltage supply designated as B+ at the various locations noted. In the application of this system to an automotive engine fuel control system, the voltage supply may be the battery or an engine driven electrical power generating system conventionally used as the vehicle's electric power source. A person skilled in the art will recognize that the electrical polarity of the voltage supply could readily be reversed.

The Circuit 100 receives, in addition to the electrical power, various sensory inputs, in the form of voltage signals in this instance, indicative of various operating parameters of the associated engine. Intake manifold pressure Sensor 21 supplies a voltage indicative of manifold pressure by means of a Variable Inductance 112. Temperature Sensor 41 illustrated as a Thermistor 114 is operative to vary the voltage across the parallel resistance associated therewith to provide a voltage signal indicative of engine temperature and voltage signals indicative of engine speed are received from the Trigger 22 at circuit input port 116. This signal may be derived from any source indicative of the engine crank angle but is preferably from the engine's ignition distributor, not shown.

The Circuit 100 is operative to generate electrical pulses to circuit location 118 controlling the conductance of transistor 120. When transistor 120 is conducting, a relatively low voltage signal is present at circuit output port 126. This port may be connected, through suitable inverters and/or amplifiers (not shown) to the fuel delivery means shown as fuel injector means 12 in FIG. 1, such that the selected fuel injector means are energized whenever the transistor 120 is conducting. It is the current practice as illustrated in FIGS. 3 and 4 to use switching means to control which of the injector valve means are coupled to circuit location 126 when the system is used for actuation of less than all injector valve means at any one time.

An intermediate first pulse is generated by the monostable multivibrator network associated with transistors 128 and 130. The presence of a trigger pulse received via input port 116 sets the multivibrator into its unstable state with transistor 128 in the conducting state and transistor 130 blocked (or in the nonconducting state). The period of time during which transistor 128 conducts is controlled by the voltage signal from manifold pressure sensor 21 by means of Variable Inductance 112. Conduction of Transistor 128 causes the collector thereof to assume a relatively low voltage close to the ground or common voltage. This low voltage causes the base of Transistor 134 to assume a low voltage below that required for Transistor 134 to be triggered into the conduction state, thus causing Transistor 134 to be turned off. The voltage at the collector of Transistor 134, therefore, rises toward the B+ value. When the voltage from the variable inductance 112 has decayed to the value necessary for the multivibrator to relax or return to its stable condition, Transistor 130 is triggered "on" and Transistor 128 turns "off". This, in turn, causes Transistor 134 to turn "on". In the original circuit, described in U.S. Pat. No. 3,646,915, the high voltage signal, generated at the collector of transistor 134 is communicated to the base of Transistor 120, turning Transistor 120 on generating the first of the two consecutive fuel injection pulses at control port 126.

During the period of time that transistor 134 is in the nonconducting, or "off" state, the relatively high voltage at collector of transistor 134 is applied to the base of transistor 136, triggering the transistor 136 to its conductive state of "on". The resistor network 138, connected to the voltage supply, acts with transistor 136 as a current source and current $I_1$ flows in the direction indicated by the arrow through the conducting transistor 136 and begins to charge capacitor 140. Simultaneously, transistor 142 is biased "on" and, with the resistor network 144, constitutes a second current source designated $I_2$ with a current flow in the direction indicated by the arrow. Currents from both sources flow into the base of transistor 146 thereby holding this transistor "on" which results in a low voltage at the collector of transistor 146. This low voltage is communicated to the base of transistor 120 via resistor 124, and switches transistor 120 "off".

When transistor 128 turns "off" signalling termination of the intermediate first pulse, transistor 134 turns on and the potential at the collector of transistor 134 falls to a low value. The current from the current source, comprised of transistor 136 and resistor network 138, now flows through the base of transistor 136 and charging of capacitor 140 ceases. The capacitor will then have been charged, with the polarity shown in FIG. 5, to a value representative of the value of current $I_1$ and the duration of the intermediate first pulse. However, at the end of the pulse when transistor 134 is turned on, the collector-base junction of capacitor 140 only slightly positive with respect to ground since several on junctions separate it from ground. This imposes a negative voltage on circuit location 148 which reverse biases diode 150 and turn transistor 146 "off". This initiates a high voltage signal at the collector of transistor 46 which is communicated to circuit location 118 via resistor 124 and re-trigger transistor 120 "on" and a control pulse appears at circuit port 126.

While the Diode 150 is reverse biased, the current $I_2$ from the current source comprised of Transistor 142 and Resistor Network 144 flows through circuit location 148 and into the capacitor 140. After a period of time, the capacitor recharges and the circuit location 148 again becomes positive. This forward biases diode 150 and transistor 146 turns back "on". Conductance of transistor 146 terminates the pulse and the fuel delivery means, not shown, terminates fuel delivery to the engine.

The duration of the pulse is a function of the time required for Circuit Location 148 to become sufficiently positive for Diode 150 to be forward biased. This, in turn, is a function of the charge on Capacitor 140 which is established by the charging current $I_1$ supplied by the current source comprised of Transistor 142 and Resistor Network 144 and the time duration $T_1$ of the first pulse. The magnitude of the recharging Current $I_2$ is a function of the base voltage at Transistor 142. This value is controlled by the voltage divider networks 152 and 154 with the effect of Network 154 being variably controlled by the resistance of thermistor 114. The duration of the second pulse $T_2$ is:

$$T_2 = I_1/I_2\, T_1$$

Because the first fuel injection pulse in the modified circuit was eliminated, the values of the charging circuit $I_1$ capacitor 140, and the recharge current $I_2$ were readjusted to generate a fuel injection pulse, having a duration equal in length to the sum of the two pulses generated by the unmodified circuit.

Still referring to FIG. 5, the relationship of the inventive to the Air Density Computer to the Fuel Control Computer 23 is illustrated. This circuitry is shown enclosed by the dashed line 200. The Air density computer circuitry is also energized by the voltage supply designated as B+. The temperature Sensor 24 in the preferred embodiment is illustrated as a Transistor 201 having temperature coefficient of conductance which is a linear function of its absolute temperature. The power input to the Transistor 201 is from a current source consisting of Transistor 202, and Resistances 203, 204 and 205 supplying a constant current to the emitter of Transistor 201. A temperature dependent voltage signal is developed across Transistor 201 which is communicated to Operational Amplifier 206 such as Motorola 1709, which amplifies and inverts the temperature signal and superimposes this inverted signal on a DC bias. The density signal from Operational Amplifier 206 is communicated to the emitter of Transistor 142 in the fuel control computer circuit 100 and is operative to control the recharging current $I_2$ flowing through Transistor 142. As discussed previously, the current $I_2$ flowing through Transistor 142 charges Capacitor 140 and is determinative of the duration of the fuel injection pulse generated by the fuel control computer 20.

The gain of the Amplifier 206 is adjusted to a predeterminable magnitude so that the change in the duration of the fuel injection pulse generated by the fuel control computer is proportional to the change in the density of the air at the intake port of the engine as determined by Air Density Computer 23. The DC bias on the density signal generated by Operational Amplifier 206 is adjusted so that a density signal, indicative of a stable intake air temperature with the engine warmed up to its nominal operating temperature is equal to signal generated at the emitter of Transistor 142, by the resistance network 144.

OPERATION

Upon starting the engine, the engine and intake system are relatively cold, therefore, the transistor 201 detecting the temperature of the air in the intake manifold will sense a temperature which is colder than normal. The signal generated across Transistor 201 will be high. This high signal is inverted by the Operational Amplifier 206 which when superimposed on the DC bias produces a density signal communicated to the emitter of Transistor 142. The density signal at the emitter of transistor 142, causes the current flowing through resistive network 144 to divide, part flowing through transistor 142 and part through operational amplifier 206. The current flowing through transistor 142 is effectively reduced, thereby increasing the time required to recharge capacitor 140. This increases the duration of the fuel injection pulse generated by the fuel control computer circuit 100 compensating for the increased density of the cold intake air. When the temperature of the intake air increases towards its normal operational temperature, the signal generated across transistor 201 decreases, and the density signal generated by operational amplifier increases having a maximum magnitude equal to the signal generated at the emitter of transistor 142 by the resistive network 144. The entire current flowing through resistive network 144 now flows through transistor 142, and the density signal from the Air Density Computer ceases to affect the duration of the fuel injection pulse generated by the Fuel Control Computer.

While the invention has been illustrated and described as embodied in a particular type of fuel injection control system, it is not intended to be limited to the details shown, since alternate types of temperature sensors may be used and various modifications and circuit structural changes may be made without departing in any way from the spirit of the present invention.

What is claimed is:

1. A fuel control system for an internal combustion engine having a controlled operating temperature, a throttle controlled air intake manifold, and at least one electrically controlled fuel injector mounted in the air intake manifold proximate the engine's intake valve port for spraying fuel into the engine in response to electrical signals comprising:

sensor means including an intake manifold pressure sensor adapted for communication with an internal combustion engine for generating signals indicative of the engine's operating parameters;

a temperature sensor means mounted in the air intake manifold proximate said fuel injector and outside the fuel spray emanating from said fuel injector for sensing the temperature of just the air in the immediate vicinity of the engine's intake valve port even after the engine has reached the controlled operating temperature and for generating a temperature signal indicative of the temperature of the air just prior to being inhaled by the engine;

constant current means, operative to communicate a constant current to said temperature sensor means;

inverter means for amplifying and inverting said temperature signal to generate an air density signal indicative of the relative density of the air being inhaled by the engine; and a fuel control computer responsive to said sensor means signals including the signals from said pressure sensor for generating electrical signals indicative of the engine fuel requirements, said fuel control computer further responsive to said air density signal for compensating said electrical signals for changes in the density of the air being inhaled by the engine;

whereby said air density compensated electrical signals communicated to said at least one fuel injector controls the fuel delivery to the engine and maintains the desired fuel to air ratio during the warm-up period after the engine has reached the controlled operating temperature but the temperature of air being inhaled by the engine is still changing.

2. The system as claimed in claim 1 wherein said inverter means further includes means for establishing a DC bias on the air density signal generated by said inverter means.

3. In combination with an internal combustion engine fuel control system having sensor means including an intake manifold pressure sensor operative to generate signals indicative of the engine's operating conditions, a fuel control computer responsive to signals from said sensor means operative to generate pressure compensated injector signals indicative of the engine's fuel requirements, and at least one fuel injector mounted in the engine's air intake manifold proximate the engine's intake valve ports for spraying fuel into said engine in response to said injector signals operative to control fuel delivery to the engine, an air density computer for compensating fuel delivery to the engine during the transient warm-up period between the time the engine starts and the engine including its accessories reach a stable operating temperature comprising:

a temperature sensor mounted in the air intake manifold of said engine proximate the fuel injector and outside the fuel spray emanating from the fuel injector for sensing changes in the temperature of just the air in the immediate vicinity of the engine's intake valve port even after the engine reaches a stable operating temperature and for generating a temperature signal indicative of the temperature of the air just prior to being inhaled by the engine;

a constant current generator, operative to provide said temperature sensor with an electrical current of a predetermined magnitude;

an amplifier, responsive to the temperature signal generated by said temperature signal for generating an amplified signal which is an inverted function of said temperature signal;

DC bias means operative to superimpose a predeterminable electrical DC bias signal on said amplified and inverted signal to produce an air density signal indicative of the relative density of the air being inhaled by the engine; and means for communicating said air density signal to the fuel control computer, wherein the fuel control computer signal indicative of the engine's fuel requirements is modulated as a function of the relative air density signal, whereby the desired fuel to air ratio delivered to the engine is maintained during the transient warm-up period.

* * * * *